United States Patent [19]

Brennan et al.

[11] Patent Number: 4,654,376

[45] Date of Patent: Mar. 31, 1987

[54] POLYURETHANE FOAMS BASED ON AMINO POLYOLS

[75] Inventors: Michael E. Brennan; Kenneth G. McDaniel; Howard P. Klein, all of Austin, Tex.

[73] Assignee: Texaco Inc., White Plains, N.Y.

[21] Appl. No.: 791,015

[22] Filed: Oct. 24, 1985

[51] Int. Cl.$^4$ .................... C08G 18/14; C08G 18/32
[52] U.S. Cl. .................... 521/167; 252/182; 521/902
[58] Field of Search ............... 521/167; 252/182

[56] References Cited

U.S. PATENT DOCUMENTS

| | | | |
|---|---|---|---|
| 3,297,597 | 1/1967 | Edwards et al. | 521/164 |
| 4,137,265 | 1/1979 | Edwards et al. | 521/167 |
| 4,485,195 | 11/1984 | Brennan et al. | 521/167 |
| 4,487,852 | 12/1984 | Brennan et al. | 521/167 |
| 4,489,178 | 12/1984 | Brennan et al. | 521/167 |
| 4,499,264 | 2/1985 | McDaniel | 527/312 |
| 4,500,655 | 2/1985 | Brennan | 521/167 |
| 4,525,488 | 6/1985 | Cuscurida et al. | 521/167 |

*Primary Examiner*—Herbert S. Cockeram
*Attorney, Agent, or Firm*—Jack H. Park; Kenneth R. Priem; Richard A. Morgan

[57] ABSTRACT

An improved method for preparing amino polyols is disclosed. The method is the Mannich condensation of phenol, formaldehyde and diethanolamine in a molar ratio of (1:1:1), and then alkoxylation with a mixture of ethylene oxide and propylene oxide in a weight ratio of about 5:95 to 20:80 to form an amino polyol of hydroxyl number 440 to 515.

The method gives higher yields of aromatic amino polyols of lower viscosity than those of the comparative example.

6 Claims, No Drawings

000
POLYURETHANE FOAMS BASED ON AMINO POLYOLS

BACKGROUND OF THE INVENTION

1. Field of the Invention

The invention is an improved process for preparing amino polyols. In particular, the invention is an improved process for making polyols which are used in preparing polyurethane or polyisocyanurate foams. Specifically, the invention is an improvement to U.S. Pat. No. 3,297,597 (Edwards et al.) patented Jan. 10, 1967.

2. Description of the Prior Art

U.S. Pat. No. 3,297,597 (Edwards et al.) describes the reaction of an alkylene oxide with the Mannich condensation product of a phenolic compound with formaldehyde and an alkanolamine. The Edwards et al. patent was a pioneer in the field. Accordingly, numerous improvements to the Edwards et al. patent have been made.

U.S. Pat. No. 4,499,264 is an improvement to the Edwards et al. patent which concerns charging ammonia or amines to the reaction vessel at the end of the alkylene oxide digestion step. The degree of alkylene oxide digestion is equilibrium limited. The ammonia or amine scavenges the residual alkylene oxide and the resulting alkanolamine becomes one of the components in the polyol mixture.

U.S Pat. No. 4,137,265 (Edwards et al.) is directed to Mannich condensates prepared by reacting a phenolic compound with formaldehyde and diethanolamine which are then propoxylated and used in the manufacture of rigid polyurethane foam.

U.S. Pat. No. 4,500,655 (Brennan) describes a polyol prepared by reacting a propoxylation product with melamine and a lower alkylene carbonate. The propoxylation product; which may contain ethylene oxide is prepared by propoxylating a condensate of phenol or a $C_1$ to $C_{12}$ alkylphenol with formaldehyde and diethanolamine in the mole ratios of 1:1:1 to 1:3:3.

U.S. Pat. No. 4,489,178 (Brennan et al.) describes Mannich condensates of phenol, formaldehyde and diethanolamine in which a minor amount of melamine is dissolved subsequent to alkoxylation with propylene oxide or a mixture of propylene oxide and ethylene oxide.

U.S. Pat. No. 4,487,852 (Brennan et al.) describes Mannich condensates of phenol, formaldehyde and an amine mixture consisting of diethanolamine and melamine which is alkoxylated with propylene oxide or a mixture of propylene oxide and ethylene oxide.

SUMMARY OF THE INVENTION

The invention is a method for preparing amino polyols which are useful in preparing polyurethane and polyisocyanurate foams. These polyols are prepared by reacting phenol, diethanolamine and formaldehyde at 50° C. to 150° C. for a period of time sufficient to reduce the formaldehyde content to no more than about 1%. Water is stripped from the reaction product. Alkylene oxide consisting of ethylene oxide and propylene oxide in a weight ratio of 5:95 to 20:80 are added to the stripped reaction product in an amount to form an amino polyol of hydroxyl numbers 440 to 515.

The method gives higher yields of aromatic amino polyols of lower viscosity than those prepared by conventional means.

DESCRIPTION OF THE PREFERRED EMBODIMENTS

The invention is an improved method for preparing an amino polyol used for preparing polyurethane or polyisocyanurate foams. The method comprises:

a. mixing phenol and diethanolamine in a phenol: diethanolamine molar ratio of about 1:1 to 1:3, b. adding formaldehyde to the mixture in a phenol: formaldehyde molar ratio of about 1:1 to 1:3 at a temperature below the temperature of Novolak formation;

c. heating the resulting mixture at a temperature within the range of about 50° C. to 150° C. for a period of time sufficient to reduce the formaldehyde content to no more than about 1%;

d. stripping the water from the reaction product; and e. adding alkylene oxides to the stripped reaction product consisting of ethylene oxide and propylene oxide in a weight ratio of ethylene oxide: propylene oxide of about 5:95 to 20:80 in an amount to form an amino polyol of hydroxyl numbers 440 to 515.

The Mannich reaction is a well-known reaction wherein any active hydrogen compound is reacted with formaldehyde and a primary or secondary amine to provide a substituted aminomethyl derivative of the active hydrogen starting material. The Mannich derivative to be employed as a starting material for the polyols of the present invention is prepared in accordance with the customary procedure using a phenolic compound, as described hereinbelow, as the active hydrogen compound. The ortho and para positions of these phenolic compounds are sufficiently reactive to enter into the Mannich reaction.

For example, the Mannich reaction may be conducted by premixing the phenolic compound with a desired amount of the alkanolamine and then slowly adding formaldehyde to the mixture. At the end of the formaldehyde addition, the reaction mixture is slowly heated with agitation to a temperature of at least about 50° C., such as a temperature within the range of about 80° C. to about 150° C. for a period of time sufficient to reduce the formaldehyde content to at least about 1 wt %. This will require normally from about two to about four hours reaction time at the elevated temperature.

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without attempting to isolate the individual components thereof. In fact, in accordance with the preferred embodiment of the present invention, the entire crude Mannich reaction product is used as such, and when this is done positive steps should be taken in order to provide the reaction product containing less than about 1 wt % of free formaldehyde.

Formaldehyde may be employed in the Mannich reaction in any of its conventional forms, such as an aqueous formalin solution, an "inhibited" methanol solution, paraformaldehyde or trioxane.

The characteristics of the Mannich product and consequently the characteristics of the alkylene oxide adduct of the Mannich product may be varied over wide limits by proper choice of the phenolic compound and alkanolamine employed and by varying the molar ratios of the reactants. For example, if phenol, diethanolamine and formaldehyde are employed in a molar ratio of 1:3:3, the predominant product will have seven hydroxyl groups attached to a single molecule. If the molar ratio of these same reactants is changed to 1:2:2, a pentol will be obtained as the predominant product. Similarly, when the molar ratios is 1:1:1, a triol is the predominant product.

If an excess of formaldehyde is used in the preparation of the triol or pentol, the Mannich reaction becomes complex due to the secondary condensation of phenol and formaldehyde. This is the well-known Novolak reaction which leads to polymethylene derivatives of phenol. For example, when phenol, diethanolamine and formaldehyde are reacted in the molar ratio of 1:1:2, the normal Mannich reaction occurs in one of the three active phenol positions. This leaves two available active positions on the phenol nucleus to undergo condensation with the excess formaldehyde. The presence of the amine groups affords sufficient base catalysis to promote the phenol-formaldehyde condensation leading to a complex reaction product.

In accordance with the present invention, the Mannich reaction product is reacted with an alkylene oxide to provide the final polyol. The nitrogen present in the Mannich condensate has sufficient catalytic activity to promote the reaction of one mole of the alkylene oxide with each free amino hydrogen atom and phenolic and primary hydroxyl group and no additional catalyst is needed. The alkoxylation is conducted at a temperature of about 30° C. to about 180° C. and the product herein defined for the purpose of this application as an "alkylene oxide adduct of the Mannich reaction product of the phenolic compound with formaldehyde and an alkanolamine."

It is, of course, possible to add less than one mole of alkylene oxide per free phenolic and primary hydroxyl group in the Mannich condensation product. The minimum desirable amount of alkylene oxide is one mole per free amino alkanol hydroxyl group and phenolic hydroxyl group. In general, phenolic hydroxyl groups form unstable urethane linkages and so are to be avoided where practical. Generally, more than the minimum amount of alkylene oxide is used to obtain a product having a lower hydroxyl number and lower viscosity.

The amino polyols produced by the method of the invention has a hydroxyl number of 440 to 515. The hydroxyl number is defined as the number of milligrams of potassium hydroxide required for the complete neutralization of the hydrolysis product of the fully acetylated derivative prepared from one gram of polyol.

As hereinbefore stated, the polyols of the present invention offer many advantages in the preparation of rigid polyurethane foams. Although a polyurethane foam may be prepared from a polyol component consisting entirely of a polyol of the present invention, it may be desirable to employ a polyol component containing from about 30 to about 100 wt % of a polyol of the present invention and, correspondingly, from about 70 to 0 wt % of a second polyol normally used to prepare rigid urethane foams, and having a hydroxyl number of from about 350 to about 900. Many examples of such polyols are known to those skilled in the art and may include those prepared by the reaction of an alkylene oxide selected from the group consisting of ethylene oxide, propylene oxide, 1,2-butylene oxide, styrene oxide, epichlorohydrin, glycidol and mixtures thereof with a polyhydric compound selected from the group consisting of carbohydrates and aliphatic and aromatic compounds containing from about three to about eight hydroxyl groups, such as hexanetriol, pentaerythritol, sorbitol, methyl glucoside, sucrose, 1,3,3-tris(hydroxypropoxyphenyl)propane, etc. In addition, alkylene oxide adducts of certain amines such as, for example, propylene oxide adducts of ethylene diamine, aminoethylpiperazine, etc., may be used. Certain hydroxy-terminated polyesters are also used to prepare rigid urethane foams. These are usually prepared from dibasic acids such as phthalic and adipic acids and diols or triols such as, for example, diethylene glycol, glycerine, trimethylolpropane, etc.

In preparing foams from the instant polyols, conventional foam preparation procedures are used with the exception that a catalyst is not needed. Polyisocyanates, blowing agents, foam stabilizers and fire-retardants useful in the preparation of rigid polyurethane foams are well known to those skilled in the art. Such components are described, for example, by Frisch et al. in an article entitled "Advances in Technology and Uses of Rigid Urethane Foams" (Modern Plastics 40, 165 (October 1962)).

In the quasi-prepolymer process, the quasi-prepolymer is prepared by the reaction of a large molar excess of a polyisocyanate with a polyol. This quasi-prepolymer is then further reacted with additional polyol and other foam components at the time of foaming. In the one-shot process, the foam components are mixed all at once.

If the quasi-prepolymer method is used to prepare rigid urethane foam in accordance with present invention, it is preferred that the quasi-prepolymer be prepared by reacting a second polyol of the type above described with an amount of polyisocyanate sufficient to provide from about 20 to 40 wt % of free isocyanato groups (based on the total amount of polyisocyanate used) in the quasi-prepolymer reaction product. An amount of the polyol of the present invention sufficient to provide about one hydroxyl group per free isocyanato group in the quasi-prepolymer is then added to the quasi-prepolymer in the presence of a foam stabilizer, a blowing agent and in some cases a fire retardant.

The most commonly used foam stabilizers are silicone oils, usually silicone-glycol copolymers such as those prepared in accordance with the disclosure of U.S. Pat. No. 2,834,748. Such materials have the formula:

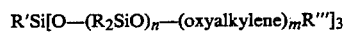

wherein R,R' and R" are alkyl groups containing 1–4 carbon atoms, n is 4–8, m is 20–40, and the oxyalkylene groups are derived from ethylene and propylene oxides or mixtures thereof. Blowing agents used to prepare urethane foams are described in U.S. Pat. No. 3,072,582. Blowing agents are generally volatile liquids such as, for example, trichlorofluoromethane and methylene chloride. Fire retardants that can be incorporated in the foaming mixture are of two types—those that are incorporated by mere mechanical mixing and those that become chemically bound in the polymer chain. The most commonly used of the first type are tris(chloroethyl)phosphate, tris(2,3-dibromopropyl)phosphate, diammonium phosphate, various halogenated compounds and antimony oxide. The second type fire retardant probably offers the best approach to the problem of fire retarding foams. Examples of this type fire retardant include chlorendic acid derivatives and various phosphorus-containing polyols.

Although the presence of a tertiary amine catalyst such as triethylenediamine, triethylamine, dimethylpiperazine, etc., is normally required to prepare an acceptable polyurethane foam, it is an advantage of the present invention that such an amine catalyst is not necessary. If a faster rise time or tack-free time is desired, a tertiary amine catalyst may be added.

The organic polyisocyanate is suitably an organic aromatic or aliphatic polyisocyanate such as 3,3'-dichloro-4,4'-biphenyl diisocyanate, diphenyl diisocyanate, ethylene diisocyanate, propylene-1,2-diisocyanate, 1,4-tetramethylene diisocyanate, p-phenylene diisocyanate, 2,4- and 2,6-toluene diisocyanates, o,o'-, o,p'- and p,p'diphenylmethane diisocyanates, hexamethylene diisocyanate, polymethylene polyphenylisocyanate, and mixtures thereof.

The specific techniques of making polyurethane foams are well known in the art. They are described for example in U.S. Pat. No. 3,297,597 incorporated herein by reference.

The invention will be illustrated further with respect to the following specific examples, which are given by way of illustration and not as limitations on the scope of this invention. The inventive examples show higher yields and better oxide utilization, the products of which have lower viscosities than the comparative examples.

EXAMPLE I

1. A 15-gallon jacketed kettle with stirring means was charged with 8.30 lbs. (40.0 moles) molten phenol ($\phi$OH) and 9.27 lbs. (40.0 moles) diethanolamine (DEA). After heating to 43° C., 7.16 lbs. (40.0 moles) 37% aqueous formaldehyde was added over 30 minutes. The whole was then digested 1.0 hr. at 43°–45° C. and then heated to 95° C. and digested an additional 2.0 hours. Water (5.95 lbs.; theor., 6.10 lbs.) was removed overhead at 104° C. max. and under partial vacuum. The remaining kettle material (Mannich condensate) was then reacted with 14.89 lbs. (120.0 moles) of a mixture of 10 wt % EO and 90 wt % PO over 55 minutes at 104°–105° C. and 47 psig max. and then the whole digested 1 hour 20 minutes at 105° C. (47-8 psig). The kettle was then vented (0.06 lbs. unreacted mixed oxides recovered) and further lights stripped (0.61 lbs.) at 105° C./~5 mm. Product (32.72 lbs.; theor., 33.52 lbs.; 97.6% yield) was then isolated warm. Table I lists details and product analyses of this and related reactions.

2. A 15-gallon jacketed kettle with stirring means was charged with 8.30 lbs. (40.0 moles) molten phenol ($\phi$OH). After heating to 43° C., 7.16 lbs. (40.0 moles) 37% aqueous formaldehyde was added over 30 minutes. At this point, 1.50 lbs. (40.0 moles) anhydrous ammonia was added from the bottom of the kettle over 40 min. at 42°–44° C., digested 1-2 hours and then 7.77 lbs (80.0 moles) ethylene oxide (EO) added over 1.0 hr. at 45°–47° C. (see 5794-51). The whole was then digested 1.0 hr. at 43°–45° C. and then heated to 95° C. and digested an additional 2.0 hours. Water (99.5% of theor.) was removed overhead at 104° C. max. and under partial vacuum. The remaining kettle material (Mannich condensate) was then reacted with 14.89 lbs. (120.0 moles) of a mixture of 10 wt % EO and 90 wt % PO over 55 minutes at 104°–105° C. and 47 psig max. and then the whole digested 1 hour 20 minutes at 105° C. (47-8 psig). The kettle was then vented and further lights stripped at 105° C./~5 mm. Product (95.8% yield) was then isolated warm.

TABLE I

| | | | Reactants, moles | | | | | | OVHD. | Product | Oxide | Material | | Viscosity | Product Total | | % Freon® | |
|---|---|---|---|---|---|---|---|---|---|---|---|---|---|---|---|---|---|---|
| NB-Page No. | φOH | 37% Aq. CH₂O | DEA | NH₃ | EO | PO | EO/PO, wt. % 10/90 | EO/PO, wt. % 15/85 | H₂O % of Theor. | Yield, % | Util % | Balance % | OH No. | (25° C.) cPs | Amine meq/g | % H₂O | R-11 Solubility | Polyurethane Foams |
| Inventive Examples | | | | | | | | | | | | | | | | | | |
| 5794-50 | 1.0 | 1.0 | 1.0 | — | — | — | 3.0 | — | 97.5 | 97.6 | 95.5 | 99.3 | 474 | 9,841 | 2.71 | 0.01 | >37.5 | 5794-67,-68,-80,-81 |
| -51 | 1.0 | 1.0 | — | 1.0 | 2.0 | — | 3.0 | — | 99.5 | 95.8 | 91.7 | 99.5 | 487 | 8,926 | 2.79 | 0.02 | >41.2 | 5794-67,-68,-80,-81 |
| -69 | 1.0 | 1.0 | 1.0 | — | — | — | — | 3.0 | 98.4 | 97.8 | 96.7 | 99.2 | 503 | 9,101 | 2.70 | 0.02 | >37.5 | 5794-97,98,-99,-100 |
| -70 | 1.0 | 1.0 | — | 1.0 | 2.0 | — | — | 3.0 | 98.2 | 94.2 | 87.5 | 99.5 | 442 | 5,535 | 2.42 | 0.01 | >41.2 | 5794-97,98,-99,-100 |
| 5843-12 | 1.0 | 1.0 | 1.05 | — | — | — | 3.1 | — | 101.1 | 98.3 | 96.6 | 100.0 | 513 | 9,313 | 2.70 | 0.01 | >41.2 | 5843-37 |
| -16 | 1.0 | 1.05 | — | 1.05 | 2.1 | — | 3.1 | — | 101.2 | 94.7 | 91.1 | 99.1 | 486 | 7,879 | 2.74 | 0.01 | >41.2 | -39 |
| -13 | 1.0 | 1.1 | 1.1 | — | — | — | 3.2 | — | 100.6 | 96.2 | 93.6 | 99.2 | 497 | 12,260 | 2.76 | 0.05 | >37.5 | -38 |
| -17 | 1.0 | 1.1 | — | 1.1 | 2.2 | — | 3.2 | — | 99.1 | 95.2 | 90.1 | 99.6 | 479 | 9,421 | 2.80 | 0.01 | >41.2 | -40 |
| 5843-18 | 1.0 | 1.05 | 1.05 | — | — | — | — | 3.1 | 100.3 | 97.0 | 95.8 | 99.1 | 503 | 11,131 | 2.77 | 0.01 | >33.3 | -42 |
| -21 | 1.0 | 1.05 | — | 1.05 | 2.1 | — | — | 3.1 | 96.6 | 94.5 | 93.9 | 97.1 | 489 | 8,147 | 2.70 | 0.01 | >41.2 | -58 |
| -19 | 1.0 | 1.1 | 1.1 | — | — | — | — | 3.2 | 99.8 | 97.8 | 96.4 | 99.4 | 507 | 10,836 | 2.79 | 0.03 | >33.3 | -57 |
| -22 | 1.0 | 1.1 | — | 1.1 | 2.2 | — | — | 3.2 | 99.1 | 97.2 | 94.1 | 99.7 | 472 | 7,615 | 2.71 | 0.09 | >41.2 | -64 |
| COMPARATIVE EXAMPLES | | | | | | | | | | | | | | | | | | |
| Thanol® R-350-X | | | | | | | | | | | | | | | | | | |
| 5794-31 | 1.0 | 1.0 | 1.0 | — | — | 3.0 | — | — | 99.8 | 94.1 | 87.2 | 99.8 | 526 | 14,856 | 2.82 | 0.06 | >44.4 | 5794-48,49,-78,-79 |
| -32 | 1.0 | 1.0 | — | 1.0 | 2.0 | 3.0 | — | — | 102.1 | 93.6 | 87.0 | 99.9 | 521 | 16,541 | 2.73 | 0.04 | >37.5 | 5794-48,49,-78,-79 |
| 5843-02 | 1.0 | 1.05 | 1.05 | — | — | 3.1 | — | — | 99.1 | 93.0 | 89.6 | 97.9 | 493 | 13,794 | 2.84 | 0.02 | >37.5 | 5794-48,49,-78,-79 |
| -06 | 1.0 | 1.05 | — | 1.05 | 2.1 | 3.1 | — | — | 97.5 | 95.0 | 90.7 | 99.0 | 510 | 13,197 | 2.77 | 0.07 | >41.2 | 5843-14 |
| -03 | 1.0 | 1.1 | 1.1 | — | — | 3.2 | — | — | 99.6 | 94.6 | 90.7 | 99.0 | 474 | 8,977 | 2.73 | 0.01 | >44.4 | -25 |
| -07 | 1.0 | 1.1 | — | 1.1 | 2.2 | 3.2 | — | — | 99.8 | 92.6 | 86.6 | 98.9 | 497 | 13,848 | 2.83 | 0.01 | >41.2 | -20 |
| | | | | | | | | | | | | | 494 | 13,413 | 2.91 | 0.02 | >41.2 | -30 |

Thanol® R-350-X
An aromatic amino polyol, hydroxyl number 330; formed by the Mannich condensation of phenol, formaldehyde and diethanol amine in a mole ratio of 1:1:1 and then propoxylated with 3 moles of propylene oxide. Sold by Texaco Chemical Co.

EXAMPLE II

Preparation of Polyurethane Foams

Rigid polyurethane foams were prepared from several of the comparative and inventive examples of Table I as the sole polyols (Table II) and with 40% Terate® 203 extender polyol (Table III). The formulation components were mixed at 2700 rpm and poured into an 8"×8"×12" (600 g pours) open mold and allowed to rise. The resulting foams were allowed to stand at room temperature for at least three days before testing. Formulations, reaction profiles and foam physical properties are detailed in Tables II and III.

TABLE II

| Polyol No. | R-350-X | 5794-31 | 5794-32 | 5794-50 | 5794-51 | 5794-69 | 5794-70 |
|---|---|---|---|---|---|---|---|
| OH No. | 526 | 521 | 493 | 474 | 487 | 503 | 442 |
| Formulation pbw | 5794-48-1 | -48-2 | -48-3 | -67-1 | -67-2 | -97-1 | -97-2 |
| Polyol | 37.3 | 37.5 | 38.7 | 39.5 | 38.9 | 38.3 | 41.0 |
| DC-193 ® | 0.5 | 0.5 | 0.5 | 0.5 | 0.5 | 0.5 | 0.5 |
| Freon ® R-11A | 13.0 | 13.0 | 13.0 | 13.0 | 13.0 | 13.0 | 13.0 |
| Mondur ® MR (I = 1.05) | 49.2 | 49.0 | 47.8 | 47.0 | 47.6 | — | — |
| PAPI ® 27 (I = 1.05) | — | — | — | — | — | 48.2 | 45.5 |
| Reaction Profile Time (Secs.), | | | | | | | |
| Mixing | 15 | 15 | 12 | 15 | 15 | 12 | 12 |
| Cream | 25 | 25 | 25 | 22 | 24 | 21 | 21 |
| Gel | 78 | 77 | 78 | 73 | 71 | 74 | 79 |
| Tack Free | 106 | 102 | 80 | 86 | 86 | 90 | 94 |
| Rise | 187 | 182 | 184 | 181 | 180 | 149 | 158 |
| Initial Surface Friability | None | None | None | None | None | None | None |
| Foam Appearance | Good | Good | Good | Good | Good | Good | Good |
| Physical Properties | | | | | | | |
| Density, pcf | 1.96 | 1.99 | 1.94 | 2.03 | 2.03 | 1.99 | 2.08 |
| K-factor | 0.118 | 0.120 | 0.124 | 0.115 | 0.110 | 0.119 | 0.119 |
| Comp. Str. (psi), | | | | | | | |
| w rise | 47.57 | 48.06 | 45.92 | 50.84 | 50.85 | 49.71 | 44.69 |
| x rise | 16.58 | 17.42 | 16.25 | 20.13 | 18.53 | 18.95 | 16.92 |
| Heat Distortion (°C.) | 158 | 144 | 146 | 126 | 136 | 136 | 12.0 |
| % Closed Cells | 92.25 | 91.09 | 90.37 | 90.45 | 91.57 | 92.41 | 91.79 |
| Friability (wt % loss, 10 min.) | 6.63 | 7.85 | 9.48 | 7.60 | 3.77 | 2.06 | 1.64 |
| ASTM 1692 Burn, in/min. | 2.57 | 2.56 | 2.71 | 2.35 | 2.48 | 2.96 | 2.71 |
| Butler Chimney Test | | | | | | | |
| Flame Height in. | >11 | >11 | >11 | >11 | >11 | >11 | >11 |
| Secs. to extinguish | 26 | 28 | 27 | 25 | 26 | 30 | 29 |
| % wt. retained. | 20.1 | 24.0 | 22.5 | 22.0 | 25.6 | 28.9 | 27.6 |
| Dimensional Stability 158° F., 100% Relative Humidity, | | | | | | | |
| 1 wk.  ΔV | +2.7 | +2.4 | +3.6 | +1.5 | +2.5 | +3.9 | 19.0 |
| ΔW | −0.3 | −0.2 | −0.3 | +0.1 | 0.0 | +0.5 | −0.2 |
| ΔL | +1.8 | +1.5 | +2.2 | +1.0 | +1.8 | +2.2 | +12.0 |
| 4 wks.  ΔV | +5.4 | +5.3 | +7.3 | +4.7 | +5.6 | +5.6 | +35.4 |
| ΔW | −0.3 | −0.2 | −0.5 | +0.1 | −0.1 | 0.0 | −1.4 |
| ΔL | +3.4 | +3.4 | +4.4 | +2.7 | +3.7 | +3.5 | +19.6 |

Mondur ® MR A polyisocyanate product of Mobay Chemical Co., 2.7 functionality made by phosgenating the reaction product of aniline and formaldehyde
DC-193 ® A silicone surfactant sold by Dow-Corning Corp.
PAPI ® A 2.7 functionality polymeric isocyanate sold by Upjohn Co.
Freon ® R-11A fluorocarbon blowing agent
Formez ® UL-32 A tin catalyst sold by Witco Chemical Co.
Terate ® 203 Dimethyl terephthalate resin modified with glycol, sold by Hercules.

TABLE III

| Polyol No. | R-350-X | 5794-31 | 5794-32 | 5794-50 | 5794-51 | 5794-69 | 5794-70 |
|---|---|---|---|---|---|---|---|
| OH No. | 526 | 521 | 493 | 474 | 487 | 503 | 422 |
| Formulation pbw | 5794-78-1 | -78-2 | -78-3 | -80-1 | -80-2 | -99-1 | -99-2 |
| Polyol | 24.6 | 24.7 | 25.2 | 25.6 | 25.3 | 25.0 | 26.2 |
| Terate ® 203 (OH = 309) | 16.4 | 16.5 | 16.8 | 17.0 | 16.9 | 16.7 | 17.4 |
| Water | 0.3 | 0.3 | 0.3 | 0.3 | 0.3 | 0.3 | 0.3 |
| DC-193 ® | 0.5 | 0.5 | 0.5 | 0.5 | 0.5 | 0.5 | 0.5 |
| Freon ® R-11A | 13.0 | 13.0 | 13.0 | 13.0 | 13.0 | 13.0 | 13.0 |
| Formez ® UL-32 | 0.01 | 0.01 | 0.01 | 0.01 | 0.01 | 0.01 | 0.01 |
| Mondur ® MR (I = 1.05) | 45.2 | 45.0 | 44.2 | 43.6 | 44.0 | — | — |
| PAPI ® 27 (I = 1.05) | — | — | — | — | — | 44.5 | 42.6 |
| Reaction Profile Time (Secs.), | | | | | | | |
| Mixing | 12 | 12 | 12 | 12 | 12 | 12 | 12 |
| Cream | 17 | 17 | 16 | 20 | 18 | 18 | 17 |
| Gel | 52 | 55 | 50 | 65 | 60 | 54 | 61 |
| Tack Free | 81 | 74 | 66 | 85 | 75 | 69 | 78 |
| Rise | 139 | 145 | 141 | 146 | 122 | 136 | 148 |
| Initial Surface Friability | Yes | Yes | Yes | Yes | None | None | None |
| Foam Appearance | Fair | Good | Good | Good | Good | Good | Good |

TABLE III-continued

| Polyol No. | R-350-X | 5794-31 | 5794-32 | 5794-50 | 5794-51 | 5794-69 | 5794-70 |
|---|---|---|---|---|---|---|---|
| OH No. | 526 | 521 | 493 | 474 | 487 | 503 | 422 |
| Formulation pbw | 5794-78-1 | -78-2 | -78-3 | -80-1 | -80-2 | -99-1 | -99-2 |
| Physical Properties | | | | | | | |
| Density, pcf | 1.65 | 1.65 | 1.65 | 1.71 | 1.69 | 1.71 | 1.73 |
| K-factor | 0.112 | 0.113 | 0.116 | 0.115 | 0.114 | 0.118 | 0.114 |
| Comp. Str. (psi), | | | | | | | |
| w rise | 40.81 | 39.69 | 38.05 | 38.07 | 38.39 | 36.52 | 37.90 |
| x rise | 10.54 | 10.54 | 10.48 | 9.81 | 9.85 | 11.45 | 12.04 |
| Heat Distortion (°C.) | 136 | 136 | 128 | 123 | 114 | 128 | 110 |
| % Closed Cells | 92.55 | 92.51 | 92.27 | 91.52 | 91.90 | 93.75 | 92.59 |
| Friability (wt % loss, 10 min.) | 2.07 | 1.65 | 1.86 | 0.61 | 0.61 | 1.18 | 1.18 |
| ASTM 1692 Burn, in/min. | 2.27 | 2.27 | 2.28 | 2.83 | 3.00 | 2.71 | 2.85 |
| Butler Chimney Test | | | | | | | |
| Flame Height in. | >11 | >11 | >11 | >11 | >11 | >11 | >11 |
| Secs. to extinguish | 25 | 23 | 24 | 25 | 23 | 24 | 25 |
| % wt. retained. | 31.4 | 35.4 | 32.1 | 39.1 | 29.5 | 35.4 | 34.2 |
| Dimensional Stability 158° F., 100% Relative Humidity, | | | | | | | |
| 1 wk. ΔV | +2.9 | +3.2 | +4.8 | +7.6 | +15.0 | +5.3 | +26.1 |
| ΔW | −0.6 | −0.5 | −0.7 | −0.3 | −0.8 | −0.3 | −1.6 |
| ΔL | +2.2 | +2.5 | +3.7 | +5.4 | +10.6 | +3.5 | +18.0 |
| 4 wks. ΔV | +7.7 | +8.6 | +13.9 | +21.0 | +43.1 | +13.7 | +58.0 |
| ΔW | −0.6 | −0.6 | −0.8 | −0.7 | −1.9 | −0.7 | 4.1 |
| ΔL | +5.1 | +5.6 | +9.3 | +13.4 | +22.8 | +8.8 | +29.2 |

The principle of the invention and the best mode contemplated for applying the principle have been described. It is to be understood that the foregoing is illustrative only and that other means and techniques can be employed without departing from the true scope of the invention defined in the following claims:

What is claimed is:

1. A method for preparing an amino polyol for use in preparing polyurethane and polyisocyanurate foams comprising:
   a. mixing phenol, anhydrous ammonia and ethylene oxide
   b. adding formaldehyde to the mixture in a phenol:-formaldehyde molar ratio of about 1:1 to 1:3 at a temperature below the temperature of Novolak formation;
   c. heating the resulting mixture at a temperature within the range of about 50° C. to 150° C. for a period of time sufficient to reduce the formaldehyde content to no more than about 1%;
   d. stripping the water from the reaction product; and
   e. adding alkylene oxides consisting of ethylene oxide and propylene oxide in a weight ratio of ethylene oxide:propylene oxide of about 5:95 to 20:80 to the stripped reaction product in an amount to form an amino polyol of hydroxyl number 440 to 515.

2. The method of claim 1 wherein the mole ratio of phenol:alkylene oxides is about 1:3 to 1:9.

3. The method of claim 1 wherein the mole ratio of phenol:alkylene oxides is about 1:3 to 1:3.5.

4. The method of claim 1 wherein the weight ratio of ethylene oxide:propylene oxide is 5:95 to 15:85.

5. A method for preparing an amino polyol for use in preparing polyurethane and polyisocyanurate foams comprising:
   a. mixing phenol, anhydrous ammonia and ethylene oxide,
   b. adding formaldehyde to the mixture in a phenol:-formaldehyde molar ratio of about 1:1 at a temperature below the temperature of Novolak formation;
   c. heating the resulting mixture at a temperature within the range of about 50° C. to 150° C. for a period of time sufficient to reduce the formaldehyde content to no more than about 1%;
   d. stripping the water from the reaction product; and
   e. adding alkylene oxides to the stripped reaction product consisting of ethylene oxide and propylene oxide in a weight ratio of ethylene oxide:propylene oxide of about 5:95 to 15:85 in the mole ratio of phenol: alkylene oxide of about 1:3 to 1:3.2.

6. In a method for preparing a rigid polyurethane foam which comprises reacting an organic polyisocyanate with a polyol component comprising from about 30 to 90 wt % of a nitrogen-containing polyol having a hydroxyl number of from about 300 to about 900 and a nitrogen content of from about 1 to about 15 wt % and, correspondingly, from about 70 to 10 wt % of a second polyol, said nitrogen-containing polyol having been prepared by a method which comprises:
   a. mixing phenol, anhydrous ammonia and ethylene oxide,
   b. adding formaldehyde to the mixture in a phenol:-formaldehyde molar ratio of about 1:1 to 1:3 at a temperature below the temperature of Novolak formation;
   c. heating the resulting mixture at a temperature within the range of about 50° C. to 150° C. for a period of time sufficient to reduce the formaldehyde content to no more than about 1%;
   d. stripping the water from the reaction product; and
   e. adding alkylene oxides to the stripped reaction product consisting of ethylene oxide and propylene oxide in a weight ratio of ethylene oxide:propylene oxide of about 5:95 to 20:80 in an amount to form an amino polyol of hydroxyl number 440 to 515.

* * * * *